(12) United States Patent
Freeman et al.

(10) Patent No.: US 10,598,755 B2
(45) Date of Patent: Mar. 24, 2020

(54) SOLAR MONITORING SYSTEM FOR MEASURING SOLAR RADIATION INTENSITY

(71) Applicant: AMRITA VISHWA VIDYAPEETHAM, Kollam (IN)

(72) Inventors: Joshua David Freeman, Penryn, CA (US); Rahul Kumar, Secunderabad (IN); Krishnashree Achuthanad, Kollam (IN)

(73) Assignee: AMRITA VISHWA VIDYAPEETHAM, Kollam (IN)

( * ) Notice: Subject to any disclaimer, the term of this patent is extended or adjusted under 35 U.S.C. 154(b) by 0 days.

(21) Appl. No.: 16/378,388

(22) Filed: Apr. 8, 2019

(65) Prior Publication Data

US 2019/0271756 A1    Sep. 5, 2019

Related U.S. Application Data

(63) Continuation-in-part of application No. 15/662,322, filed on Jul. 28, 2017, now Pat. No. 10,295,404.

(30) Foreign Application Priority Data

Jul. 28, 2016    (IN) .............................. 201641025797

(51) Int. Cl.
*G01J 1/42* (2006.01)
*G01S 3/786* (2006.01)
*G01J 1/02* (2006.01)
*G01J 1/04* (2006.01)

(52) U.S. Cl.
CPC .......... *G01S 3/7862* (2013.01); *G01J 1/0219* (2013.01); *G01J 1/0437* (2013.01); *G01J 1/4228* (2013.01); *G01J 2001/4233* (2013.01); *G01J 2001/4285* (2013.01)

(58) Field of Classification Search
CPC ..... G01S 3/7862; G01J 1/0437; G01J 1/0219; G01J 1/4228; G01J 2001/4285; G01J 2001/4233
USPC ...................................................... 250/203.4
See application file for complete search history.

(56) References Cited

U.S. PATENT DOCUMENTS

| 4,491,727 | A  | * | 1/1985 | Appelbaum | G01J 1/04 356/222 |
| 6,849,842 | B2 | * | 2/2005 | Little | G01J 1/04 126/573 |
| 8,972,221 | B2 |   | 3/2015 | Kerrigan et al. | |
| 2015/0177415 | A1 |   | 6/2015 | Bing | |

* cited by examiner

*Primary Examiner* — Seung C Sohn
(74) *Attorney, Agent, or Firm* — Convergence Intellectual Property Law P.C.; Jonathan Garfinkel (57) ABSTRACT

A solar monitoring system for measuring solar radiation intensity comprising a tracking unit having two-axis movement comprising, head mounted with first and second irradiation measuring units, and a controller. The first irradiation measuring unit comprises a direct normal irradiance (DNI) sensor and the second irradiation measuring unit includes a diffuse horizontal irradiance (DHI) sensor and a global horizontal irradiance (GHI) sensor. The controller receives inputs from the sensors or a software program configured to control orientation of the image capturing head so that the DNI sensor is always exposed to the sun, and the shading disc is always directly between the DHI sensor and the sun.

14 Claims, 5 Drawing Sheets

SOLAR MONITORING SYSTEM FOR MEASURING SOLAR RADIATION INTENSITY

CROSS-REFERENCES TO RELATED APPLICATIONS

This application is a continuation-in-part of U.S. patent application Ser. No. 15/662,322 entitled "SOLAR MONITORING SYSTEM FOR MEASURING SOLAR RADIATION INTENSITY" filed on Jul. 28, 2017, which claims priority to Indian patent application No. 201641025797 entitled "SOLAR MONITORING SYSTEM FOR MEASURING SOLAR RADIATION INTENSITY" filed on Jul. 28, 2016.

FIELD OF THE INVENTION

The present invention relates to a solar monitoring system for measuring the solar radiation intensity used in solar energy systems. The invention also relates to a solar tracking mechanism for accurately pointing particular sensors directly at the sun.

DESCRIPTION OF THE RELATED ART

In this era of increasing energy demand and shortage of conventional energy resources, solar energy is a renewable energy source that is increasingly becoming cost-competitive. Solar energy systems convert solar radiation into one or the other forms of energy which can be readily used, such as heat or electricity. One of the primary needs in assessing a site for such energy system is to accurately measure and analyze the solar radiation characteristics at the given location. An accurate measurement of the solar radiation is required to determine the feasibility of harnessing solar energy at that site. In addition, the values of solar radiation for a particular site are highly variable and change significantly with the time of day, time of year, weather, and other parameters. There are three main types of solar radiation, which are commonly measured and utilized: DNI (Direct Normal Irradiance), DHI (Diffuse Horizontal Irradiance), and GHI (Global Horizontal Irradiance).

Direct normal irradiance (DNI) is the solar radiation directly received from the sun falling on a square unit area of a surface whose normal (perpendicular to a given object) is always pointing to the sun. Most concentrating solar thermal energy systems can only utilize DNI radiation. Thus, it is very important to measure this parameter independently. Pyrheliometers are commonly used to measure this value. In order to continuously measure the solar radiation coming directly from the sun, the pyrheliometer must track or follow the position of the sun, which is constantly changing throughout the day and year, with a high degree of accuracy.

Diffuse horizontal irradiance (DHI) is the radiation measured on a horizontal plane which is not directly from the sun. It is a measure of only the solar radiation that has been reflected off various surfaces such as clouds, the ground, buildings, etc. A solar radiation measurement sensor such as a pyranometer is typically used to measure this value, although other solar radiation sensors which perform a similar function may be used as well. However, the sunlight which comes directly from the sun must be blocked by using shading devices such as shading ring or a shading disc, which is placed directly between the pyranometer and the sun. As the position of the sun is constantly changing in the sky, the shading device must move to track or follow the sun along the elevation axis with a high degree of accuracy, such that the shading device is always directly between the sun and the pyranometer, and always casting a shadow over the pyranometer. Global horizontal irradiance (GHI) is the overall radiation intensity measured on a horizontal unit area, provided the radiation is coming from the entire dome of the sky. It is commonly measured using a pyranometer and measures total solar radiation, both direct and diffuse, incident on a horizontal, non-tracked surface. This information is especially useful for solar PV installations.

Comprehensive solar measurement system for an accurate assessment of the solar energy potential at a site must measure the DNI, DHI, and GHI radiation over a period of time, either diurnal or seasonal cycles or both. This typically requires a solar-tracking pyrheliometer, a horizontal pyranometer with a solar-tracking shading device, and a horizontal unshaded pyranometer. Other sensors or combinations of sensors with similar capabilities to the pyrheliometer and pyranometer can also be substituted respectively, without loss of functionality.

Most of the systems on the market for measuring comprehensive solar radiation for direct normal irradiance (DNI), diffuse horizontal irradiance (DHI) and global horizontal irradiance (GHI) are expensive and complicated in design. They employ either parallelogram, four-bar linkages to control the shading disc, such as the Kipp and Zonen Solsys sun tracker, or employ a shading ring, such as the Eko instruments RSR-01 shadow ring. These systems have the disadvantage of blocking more diffuse radiation than intended. Further, they are designed to be constructed with a greater number of moving parts, with associated disadvantages.

The present disclosure addresses some of the drawbacks of conventional methods and satisfies the need for a system that is simpler in construction, cheaper, more reliable, less prone to wear and tear, and more accurate for measuring the solar radiation, with further related advantages as set forth here.

SUMMARY OF THE INVENTION

In one aspect, the invention discloses a solar monitoring system for measuring solar radiation intensity. The system comprises a tracking unit having movement about an azimuth axis and an elevation axis comprising an image capturing head mounted with first and second irradiation measuring units. The first irradiation measuring unit comprises a direct normal irradiance (DNI) sensor and the second irradiation measuring unit includes a diffuse horizontal irradiance (DHI) sensor and a global horizontal irradiance (GHI) sensor affixed along the elevation axis.

In one aspect of the system, the diffuse horizontal irradiance (DHI) sensor further comprises a shading disc masking direct solar exposure thereon. Further, a controller that receives inputs from the sensors of irradiation measuring units or a software program and is configured to control orientation of the image capturing head so that the DNI sensor is always exposed to the sun and the shading disc is always directly between the DHI sensor and the sun. In various embodiments, the DNI sensor and shading disc tracking head is a pan-tilt head and, the first irradiation measuring unit is a pyrheliometer and the second irradiation measuring unit is a pyranometer. Each sensor may be an optical sensor for measuring the intensity of various radiation parameters of the sun.

In one aspect of the system, the controller is configured to drive motors for the azimuth and elevation axes of rotation of the tracking unit in response to the sensor or software program inputs. The controller further includes a processor, memory, and optional display, and communication hardware. The processor is configured to receive inputs from the sensor and transmit instructions to control the tracking unit based on the sensor inputs according to programmed instructions.

In various aspects of the invention, the controller is configured on a computing device such as a laptop, a wearable computer, an embedded computer, a personal digital assistant (PDA), a mobile phone, a smart phone or a tablet. In one aspect, the controller receives inputs from the sensors via wired or wireless communication. The wireless network operates on a WiFi or an infrared or a Bluetooth or a ZigBee or a similar communication protocol in the system.

In various aspects of the invention, the system further comprises a tilt sensor to identify non-level installation and an electronic compass to determine directional orientation. In one aspect, the tilt sensor and the electronic compass are configured to provide inputs to the controller. The controller is configured to self-compensate for level and directional orientation in positioning the image capturing head.

BRIEF DESCRIPTION OF THE DRAWINGS

The invention has other advantages and features which will be more readily apparent from the following detailed description of the invention and the appended claims, when taken in conjunction with the accompanying drawings, in which:

Referring to the drawings, like numbers indicate like parts throughout the views.

DETAILED DESCRIPTION

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments includes a solar monitoring system for measuring solar radiation intensity is further described with reference to the sequentially numbered figures. The solar monitoring system for measuring the solar radiation intensity is used in various aspects of the solar energy system. A solar tracking mechanism with an irradiation measuring unit is used for determining the irradiance from the sun.

Figure 1:
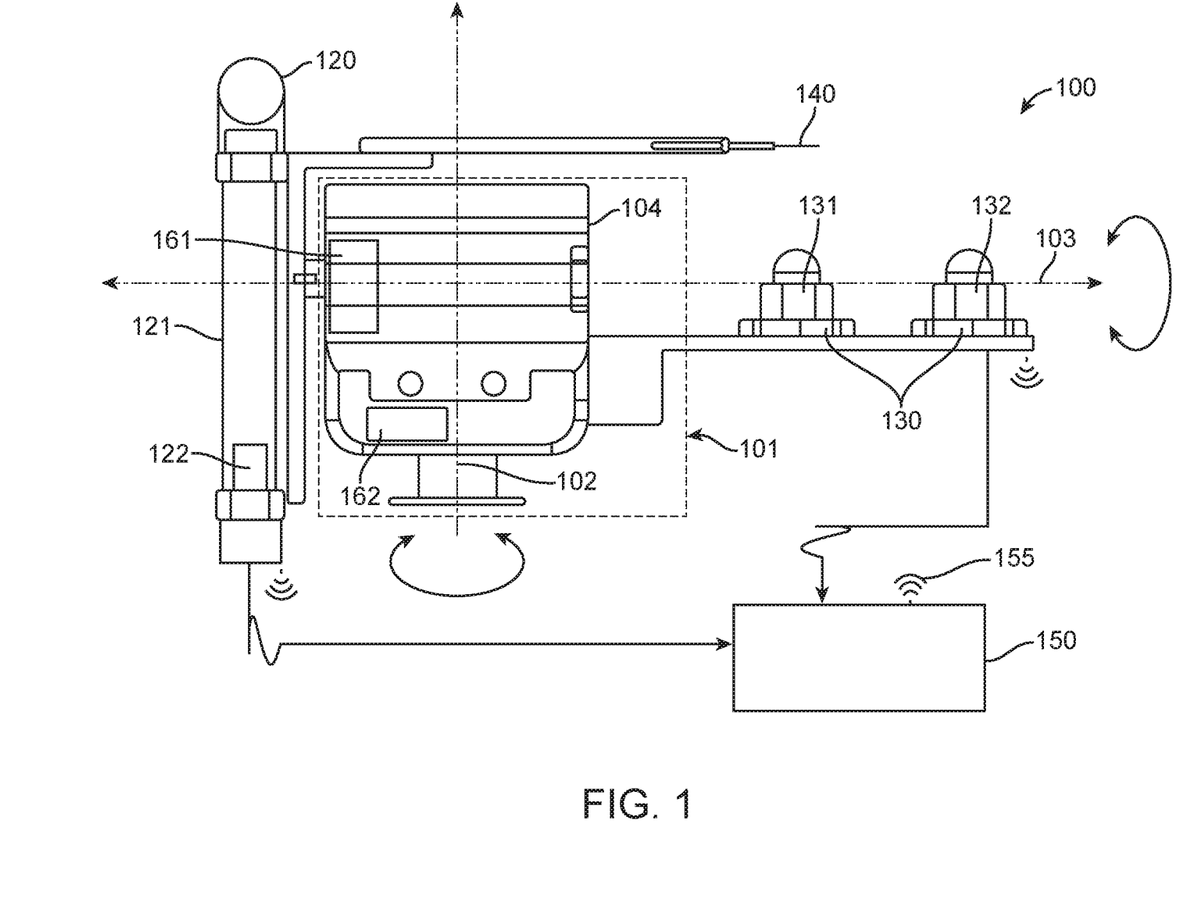
FIG. 1 shows a solar monitoring system for measuring solar radiation intensity according to one embodiment of the invention.

In one embodiment the solar monitoring system 100 shown in FIG. 1, includes a tracking unit 101 containing a tracking head 104 that is movable about an azimuth axis 102 and an elevation axis 103. Tracking head 104 may be a pan-tilt head that is mounted with first irradiation measuring unit 120 and second irradiation measuring unit 130. In various embodiments, the tracking unit is configured to rotate about the azimuth axis 102 and the elevation axis 103. The first irradiation measuring unit 120 comprises an elongated hollow tube 121 that includes a direct normal irradiance (DNI) sensor 122 affixed inside the bottom of tube 121. The second irradiation measuring unit 130 includes general solar radiation intensity sensors (pyranometers in this embodiment) configured as a diffuse horizontal irradiance (DHI) sensor 131 and a global horizontal irradiance (GHI) sensor 132. Sensors 131 and 132 affixed along the elevation axis 103 have their sensing elements horizontally and aligned on the axis 103, so that together they rotate or pan in the azimuthal or horizontal direction.

In various embodiments, the diffuse horizontal irradiance (DHI) sensor 131 further comprises a shading disc 140 for masking direct solar exposure over sensor 131. As observed in FIG. 1, the shading disc 140 is mechanically affixed to the whole assembly so that whenever sensor 122 is exposed to the sun, disc 140 covers sensor 131 from direct solar irradiance.

The system further includes a controller 150 configured to control orientation of the tracking head 104 so that sensor 122 always exposed to the sun, and the shading disc is always directly between the sensor 131 and the sun. In one embodiment, the controller 150 receives control input from a Solar Position Algorithm, which may be running in controller 150 or running in an external processor, with control information transferred by a network or communication line to controller 150. These control inputs are used to configure a pair of motors 161 and 162 for rotating the pan/tilt head 104 with respect to the two axes 102 and 103. Henceforth, orientation of the pan/tilt head 104 is controlled in such a manner so that sensor 122 is always exposed to the sun, and the shading disc is always directly between sensor 131 and the sun. In one embodiment, the two axes 102 and 103 of the pan/tilt head 104 are rotated by a motor connected to a harmonic gear head.

As illustrated in FIG. 1, the solar monitoring system 100 in one embodiment comprises dual axis movement, about the vertical or azimuth axis 102 and the horizontal or elevation axis 103. In various embodiments, depending on the terrain on which the equipment is located, there may be slight deviation of the azimuthal axis 103 from the vertical, although the axis is intended to have a substantially vertical orientation. Similarly, the elevation axis 102 may slightly deviate from the horizontal. In one embodiment, the system 100 may further include a mechanical leveling stage for level mounting of the equipment in uneven terrain. However, the two-axis movement is intended to compensate for minor deviations of a few degrees from level positioning to enable proper functioning of the system. In some embodiments the system 100 may comprise additional sensors (not shown) for identifying the orientation of the system 100, such as an electronic compass, and for self-correcting for non-level installation, such as electronic tilt meters, levels or accelerometers or manually leveling and precisely positioning, installing and calibrating the system.

In one embodiment, the pan/tilt head 104 may be a pan-tilt (PT) head. Alternatively, in one embodiment, the device with the same functionality as the pan-tilt (PT) head may be custom fabricated from elements such as motors, gears, and motor driving circuits. The pan-tilt (PT) head device constitutes dual axis rotational tracking capabilities, which can be moved around to track and sense the solar radiation in a larger area of the sky. The pan movement of the pan-tilt (PT) head device is analogous to azimuth axis 102 of rotation for the tracking unit 101. The tilt movement of the pan-tilt (PT) head device is analogous to elevation axis 103 of rotation for the tracking unit 101.

In one embodiment, the first irradiation measuring unit 120 may comprise a pyrheliometer 122 and the second irradiation measuring unit 130 may comprise pyranometers 131 and 132. In one embodiment each sensor 122, 131 and 132 of the irradiation unit 120 and 130 may be any optical sensor for determining the relevant intensity of the sun. The optical sensor converts incident solar irradiation into electronic signals, which measures the physical quantity of light and then translates it into a readable form. In one embodiment, other equivalent sensors to the pyrheliometer and pyranometers for measuring the solar irradiation may also be used, which provide analog voltage signals, proportional to the amount of incident irradiation. In various embodiments, the optical sensors may be chosen based on wavelength, forward (drive) current, acceptance angle, range, power dissipation, packaging type etc. and may communicate their readings via analog or digital methods.

Figure 2:
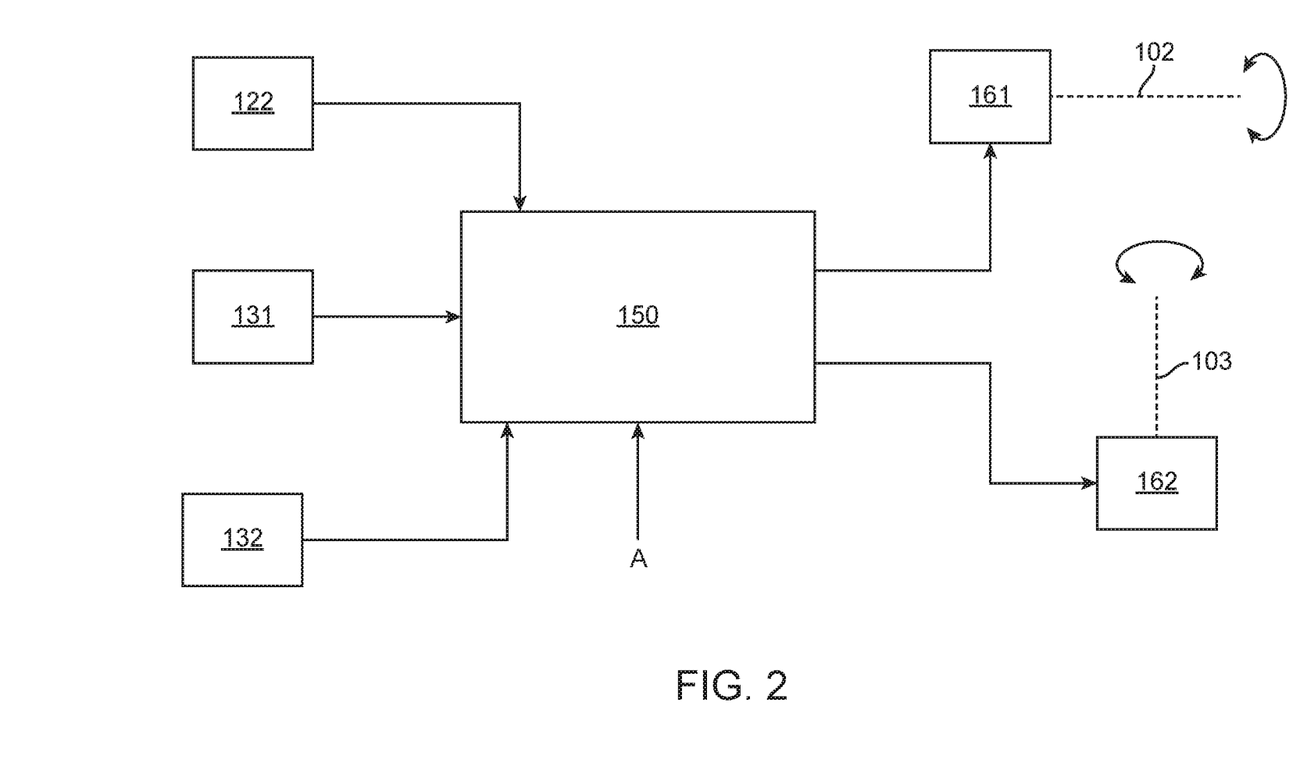
FIG. 2 illustrates the control system of the solar monitoring device according to one embodiment.

In one embodiment as illustrated in FIG. 2, the controller 150 is configured to drive motors 161 and 162 for the two axes 102 and 103 of rotation of the tracking unit 101 (FIG. 1) in response to the sensor inputs. The pan/tilt head 104 (FIG. 1) head have motors 161 and 162 inbuilt, with or without additional gearing. In one embodiment, the pan/tilt head 104 (FIG. 1) may use an encoder such as a magnetic or optical encoder and a potentiometer, or other types of sensors to determine the angular position or amount of rotation in the different directions of rotation. In some embodiments, the controller 150 or 250 uses standard digital protocol such as the PELCO-D, or other standard communications and control protocols. Therefore, orientation of the pan/tilt head 104 (FIG. 1) is controlled in such a manner, so that sensor 122 is always exposed to the sun, and the shading disc is always directly between sensor 131 and the sun.

Figure 3:
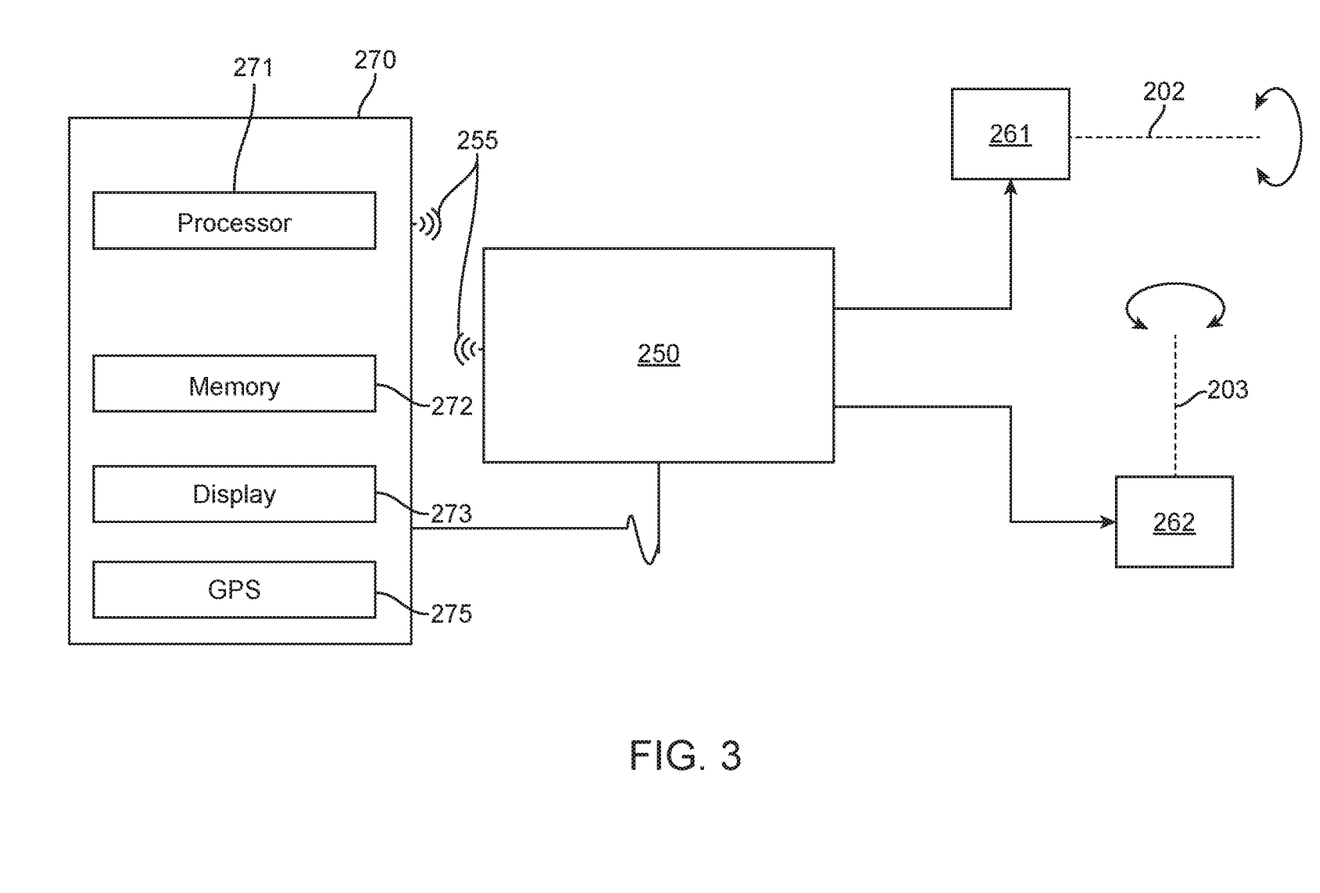
FIG. 3 is a schematic of another embodiment of the control system of the solar monitoring device for measuring solar radiation intensity.

In one embodiment as illustrated in FIG. 3, the controller 250 may be further connected to a computing device 270 comprising processor 271, memory 272, and display 273, and through a communication network 255 to provide enhanced functionality for remote monitoring and control. In various embodiments, the processor 271 is configured to calculate the sun's position via the Sun Position Algorithm or receive inputs from sensors and transmit instructions to control the tracking unit 101 according to programmed instructions. In various embodiments, the computing device 270 is configured to be a computing device such as a laptop, a wearable computer, an embedded computer, a personal digital assistant (PDA), a mobile phone, a smart phone or a tablet.

In one embodiment, the controller 250 may receive inputs from the sensors via communication network 255 by wired or wireless communication. In one embodiment of the system 100, the operating condition of the more motors 161, 162, 261 or 262 may be controlled in response to instructions received via a manual input, control signal from control unit 150 or 250 or a programmed input from the computing device 270. In various embodiments, the wireless network may operate on a protocol such as WiFi, an infrared, Bluetooth, a ZigBee communication protocol or other similar protocols.

In one embodiment, the computing device 270 may include a GPS receiver 275 to geolocate the system. In this embodiment, the system 100 is configured to orient itself to the sun using a Sun Position Algorithm (SPA) such as given by NREL (National Renewable Energy Laboratories, USA), stored in memory 272 of the control electronic device 270. The algorithm may be configured to compute the precise position of the sun, based on the exact time and location of the system and provide control inputs to the control electronics located within controller 250 so as to accurately orient the pan/tilt head 104 toward the sun. Instead of the GPS sensor, the GPS information may also be entered manually into the device and the necessary sun position calculations performed In various embodiments, controller 150 or 250 may use one or a combination of proportional, integral, or derivative control algorithms to ensure that sensor 122 is always pointed directly at the sun, and the shading disc is always directly between sensor 131 and the sun. While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope. Any other solar monitoring system for measuring solar radiation intensity used in the manner illustrated also falls within the scope of the invention, as further illustrated with reference to the examples below. However, the system can be used in identifying solar radiation intensity for applications in many fields such as agriculture, astronomy, atmospheric study, hydrology, oceanography, and renewable energy. However, the examples are not to be construed as limiting the scope of the invention as defined by the appended claims.

EXAMPLES

Example—1: Construction of Solar Monitoring System

The design centers around the use of a conventional pan/tilt motor head for the purpose of two axes rotational tracking movements. The solar monitoring system or tracker includes a standard pyrheliometer, two standard pyranometers, and a shading eye/disc were used for measuring the incident radiation. Design modifications were made to the PT head so as to fit in the pyrheliometer and pyranometer firmly on to the structure.

The sun's position can be completely described as an azimuth angle/elevation angle pair (or equivalent coordinate set which can be proved using a coordinate transform). Therefore, a device with two single axis rotational tracking with mutually orthogonal (perpendicular) axes is used to track the sun's position. One rotational axis should be pointing straight up (normal to the earth's horizontal surface) and the second axis should be in a horizontal direction. The second axis rotates upon the first, such that when the first axis is rotated, the azimuth angle of the device changes, while when the second axis is rotated, the elevation angle of the device changes.

The pyrheliometer is attached to the two-axis device such as to always be pointing towards the sun. This measures the direct normal irradiance (DNI). The pyrheliometer used to measure the DNI has a full field view angle of 5°. A shading disc can also be attached to this device such as to always be directly in between a pyranometer fixed to a horizontal plane of this device and the sun. However, the sensing element of this pyranometer must lie on the axis of rotation of the shading disc. This pyranometer will measure the diffuse horizontal irradiance (DHI). A second pyranometer can be attached to the same or any other different fixed horizontal plane of the device. This second pyranometer will measure the global horizontal irradiance (GHI). The measured irradiance is expressed in W/m$^2$ for all sensors. The sensitivity of the pyranometer is $15 \times 10^{-6}$ V/(W/m$^2$) and that of the pyrheliometer is $10 \times 10^{-6}$ V/(W/m$^2$).

Attaching the pyrheliometer to the dual axis tracking unit is relatively straight-forward, and attaching two pyranometers to horizontal planes of the device is also straight-forward. However, it can be rather difficult to make a shading disc always lie directly between the sun and one of the pyranometers, regardless of where the sun is at in the sky. Typically, a parallel bar/link mechanism is used to do this, which is a more complicated system. In other instances, a shading ring is used, which blocks a substantial portion of the diffuse radiation which should be measured. However, by locating one of the pyranometers directly on the second, horizontal rotational axis, and fixing the shading disc on an arm extending perpendicular to the second axis, which rotates about the second axis, it can be assured that if the arm is pointing to the sun, then the shading disc will always be directly in between the sun and the pyranometer, for any position of the sun.

The solar monitoring system configured by a pan-tilt motor head relating to its operation. A pan-tilt (PT) head is one device on the market which has dual axis rotational tracking capabilities. They are typically used to mount a surveillance camera such that it can be moved around to view a larger area. The pan movement of the PT head is made analogous to azimuth tracking, and the tilt movement of the PT head is made analogous to elevation angle tracking. The pyrheliometer can be mounted to the tilting part of the PT camera head such that it can always pointing at the sun, when the PT head is properly controlled, giving DNI measurements. A horizontal surface can be mounted with two pyranometer to the panning part of the PT casing.

The pyranometers remain flat at all times, although they do rotate in the azimuth direction, which does not affect their reading. The shading disc is then attached to an arm which is attached to the tilting part of the PT head. This arm extends over the pyranometers and when the PT head is controlled correctly, the shading disc will always shade one of the pyranometers from direct sunlight, giving DHI measurements. The other pyranometer is always left unshaded and horizontal, giving GHI measurements. In this way, a comprehensive solar measurement system for measuring DNI, DHI, and GHI, is created that uses only a PT head and shading disc and does not use a parallelogram, four-bar linkage or a shading ring.

Example—2: Communication and Network Architecture for the System

Figure 4:
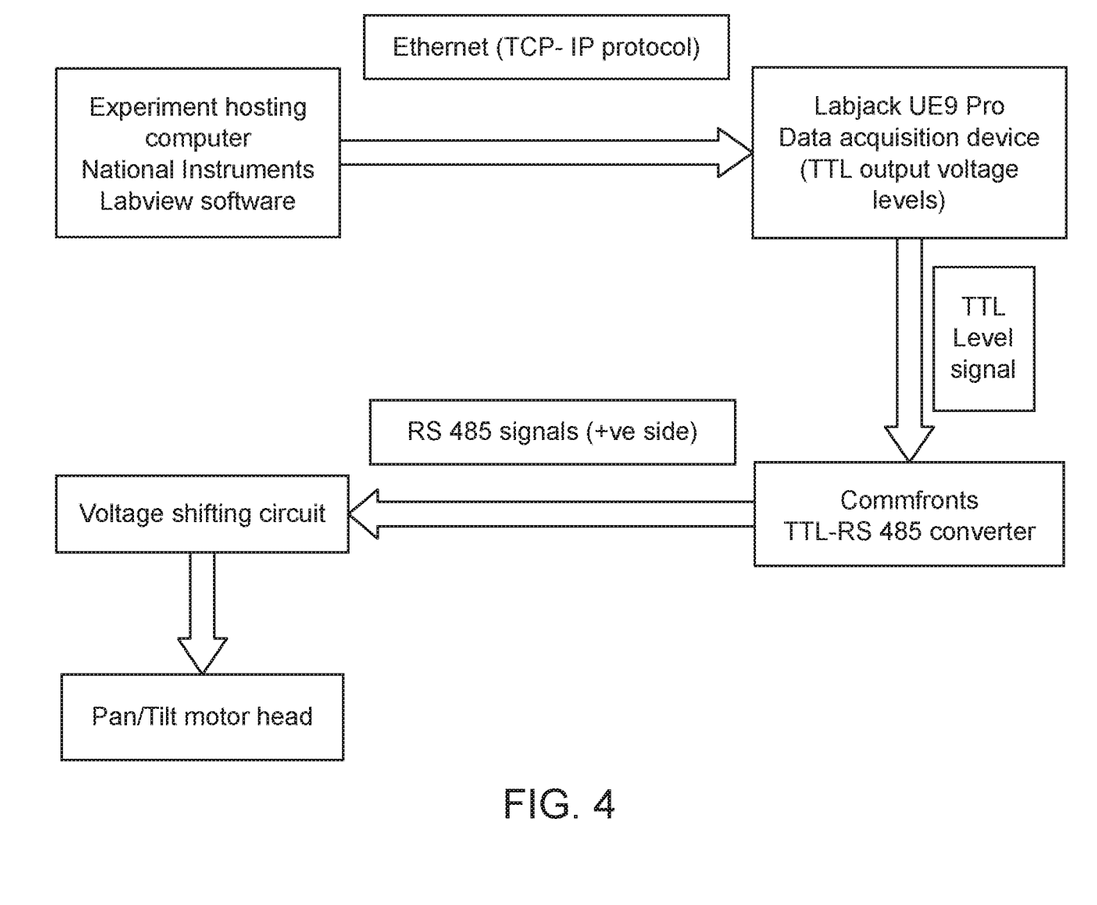
FIG. 4 illustrates an embodiment of the communication architecture for the system for controlling the motor head according to the position of the sun.

In one embodiment, a desktop computer runs LabVIEW software and uses the SUNAE or a similar Solar Position Algorithm to determine the sun's position. The communication architecture used in this system is shown in FIG. 4.

LabVIEW provides control signals which are sent over the internet using TCP-IP protocols to a Labjack UE9 Pro data acquisition and control (DAQ) device. The LabJack UE9 Pro sends TTL serial data commands to a Commfront TTL-RS 485 serial converter, which then converts the TTL signals to RS-485 voltage levels to be given to the PT motor head. This establishes the communication between the Labjack and the PT motor head. Labview creates movement commands using PELCO-D serial communications protocol.

Figure 5:
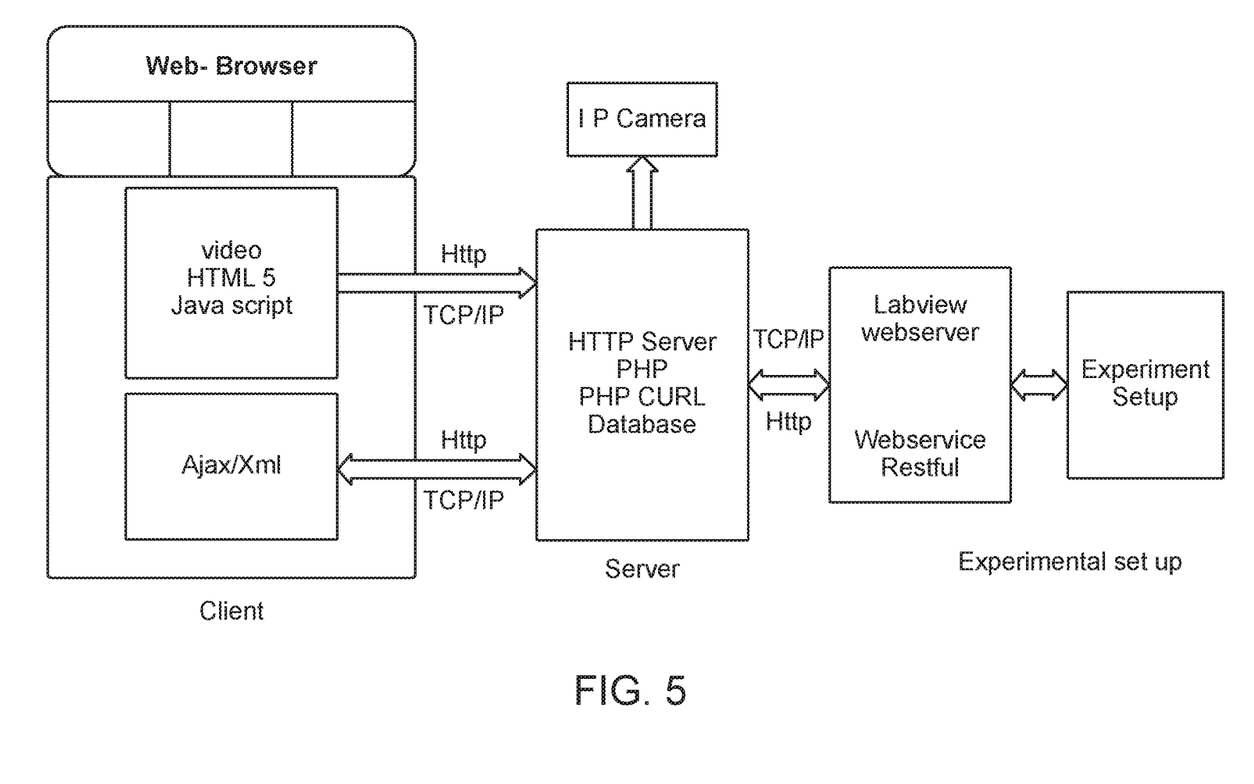
FIG. 5 illustrates the client-server architecture for the solar monitoring system used in an embodiment.

The Labjack UE9 Pro is assigned with the specific IP address avoiding the necessity of a computer near the tracker for interfacing with the LabVIEW program. The Labview software has the web interface module which allows communication to the Labjack. The serial commands are send to the Labjack from the LabVIEW, in accordance with the pre-programmed logic. The client-server architecture used in this system is shown in FIG. 5.

LabVIEW software controls the pan-tilt (PT) motor using the PELCO-D serial commands. It's a seven-byte hexadecimal command structure. The significance of the byte variables used are as follows:
  Byte1: Synchronization byte
  Byte2: The equipment address
  Byte3: Camera functionality
  Byte4: Motor head functionality
  Byte 5: Motor pan speed
  Byte 6: Motor tilt speed
  Byte 7: Checksum of the bytes These seven bytes add up to make the PELCO-D command structure and are serially sent to the pan-tilt (PT) motor head. Bytes 1 through 3 are constants. Bytes 4 through 7 are variables which are being controlled from the Labview program in real time, either by user initiated or program initiated.

Example—3: Pan/Tilt Movements and Tracking Algorithm

Using SUNAE algorithm, the solar position angles at a given location at a given time is calculated. The pyrheliometer pointing direction is kept aligned to these angles, so as to track the sun. The slowest turning speed of the motor head is 0.25 degrees/second. The solar elevation slew rate as per the algorithm is 0.00333 degrees/second. Therefore, in order to track the elevation angle correctly, the motor tilt movement is adjusted by 0.25 degrees every 75 seconds. Similarly, the solar azimuth slew rate as per the algorithm is 0.01666 degrees/second. Therefore, to track the azimuth angle properly the motor pan movement is adjusted by 0.25 degrees every 150 seconds. When the solar elevation is greater than zero degree, the tracking mechanism starts tracking the sun. This tracking is continued until the solar elevation is less than zero degree. The whole tracking mechanism is automatically calibrated back to its starting position at 12.00 am local time at the start of each experiment.

Example—4: Prototype Solar Irradiance Measurement Unit

The components used for the prototype are tracking unit, pyranometers, pyrheliometers, stepper motors with controllers and data acquisition unit. Design modifications were performed to the pan/tilt motor head so as to accommodate the pyrheliometer and the pyranometers. The camera mount was modified to use stepper motor controllers for control of the two bipolar stepper motors, to handle the torque of the sensors and holding equipment. The horizontal and the vertical axis are each rotated by the stepper motor that is directly connected to a harmonic gear head with zero backlash. The controlling and the data acquisition were done with the help of an Ethernet powered data acquisition device, however a wide variety of data acquisition and control systems were implemented.

The system includes two bipolar stepper motors with driver cards, sensors to measure the different solar irradiances, hardware mounting, a data acquisition and control unit (DAQ), which performs the DAQ of the whole system and an application program that controls the hardware. The system is configured with an algorithm for tracking the sun and calculating the different radiation intensities. The process starts with checking if the elevation and azimuth stepper motors are at zero position using two limit switches, and if not, to rotate the motors in the corresponding directions and calibrate them to zero position. These limit switches give voltage feedback to the application program through the DAQ, according to which the program rotates the motors to the calibrated zero-angle position before starting an experiment. The hosting location was relatively near to the equator and the sunrise and sunset times did not vary significantly throughout the year. The control program then checks if the time of day is not within the prescribed limits (6 am to 7 pm), and if not, the experiment will not get executed and a message is displayed to the user on the web interface, to "Perform the experiment during daylight hours in India". After ensuring the time of execution, the real time solar elevation and azimuth angles are calculated using the solar position algorithm coded into the application program. Using the latitude and longitude of the installed tracking system, the program outputs the desired, real time, absolute solar position angles for the tracker.

The movements of the tracker are controlled by an application program which provides signals to the DAQ to control the azimuth and elevation stepper motors. The angles are then verified for conditions such as if the solar elevation angle is greater than zero degrees, and if the calculated azimuth angle is less than 360°. There is a time delay between the tracker calculating the current elevation and azimuth angles and the stepper motor controller turning the motor to the desired angle. If the difference between the current system time and the last accessed time is small, a short delay is added to ensure time for the minimum stepper motor angle rotation of 1.8°. If all of these conditions are satisfied, the run time for the azimuth and elevation stepper motors are calculated, from the angles provided by the algorithm, to position the tracker in current, actual solar angles.

When the tracking system reaches the desired position, the pyranometers and pyrheliometer measure the GHI and DNI. The output of the irradiance sensors is an analog voltage which is connected to the analog input ports of the DAQ. The voltage values are fetched from the DAQ using the application program and converted to the corresponding irradiance value in physical units, $W/m^2$, using the sensitivity factor of the sensors. The data is then sent to the web interface for display. After the set time interval, the new, real-time position of the sun is calculated using the tracking algorithm and the tracker position is accordingly adjusted to measure the solar irradiance. This continues until the user stops the experiment.

The DAQ receives control signals from a LabVIEW Virtual Instrumentation (VI) application program. The control signals are sent and acquired from the interfaced hardware as well as sensors. The DAQ device can be accessed using a static IP address, from the application VI over Ethernet. A micro stepping stepper motor drive system is connected to and commanded by the DAQ unit, which turns the stepper motor rotation on or off and also changes the direction of rotation. The DAQ unit commands are determined by the solar position algorithm in the application program. The sensor outputs are connected to the analog input channels of the DAQ device and interfaced to the application program to calculate the irradiance values. Since the hardware setup is remote-controlled, the software used to control the system needs to be efficient, simple, and secure. User-friendly VIs are used to achieve the remote control of the system, integrating the acquisition, control, analysis, and display of data. The control server that hosts LabVIEW and the application program VI, is interfaced to the DAQ card through Ethernet. To allow remote access, a web interface is implemented, which sends and receives control signals and data from the LabVIEW web server.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A solar monitoring apparatus for measuring solar radiation intensity comprising:
    a tracking unit having movement about an azimuth axis and an elevation axis comprising a tracking head mounted with a first and a second irradiation measuring unit, wherein the first irradiation measuring unit comprises a direct normal irradiance (DNI) sensor configured to point towards the sun and the second irradiation measuring unit comprises a diffuse horizontal irradiance (DHI) sensor and a global horizontal irradiance (GHI) sensor affixed along the elevation axis; and
    a shading disc affixed to an arm of the tracking unit and configured to extend perpendicular to the azimuth axis and mask direct solar exposure on the DHI sensor.

2. The apparatus of claim 1, wherein the tracking head is a pan-tilt head.

3. The apparatus of claim 1, wherein the first irradiation measuring unit is a pyrheliometer and the second irradiation measuring unit is a pyranometer.

4. The apparatus of claim 1, wherein each sensor is an optical sensor for measuring radiation intensity of the sun.

5. The apparatus of claim 1, wherein the controller is configured to drive motors for the azimuth and elevation axes of rotation of the tracking unit in response to the sensor or software program inputs.

6. The apparatus of claim 1, wherein the controller further includes a processor, memory, display, and communication hardware, and wherein the processor is configured to receive inputs from the sensor and transmit instructions to control the tracking unit based on the sensor inputs according to programmed instructions.

7. The apparatus of claim 1, wherein the controller is configured on a computing device such as a laptop, a wearable computer, an embedded computer, a personal digital assistant (PDA), a mobile phone, a smart phone or a tablet.

8. The apparatus of claim 1, wherein the controller receives inputs from the sensors via wired or wireless communication.

9. The apparatus of claim 8, wherein the wireless network operates on a WiFi, infrared, Bluetooth or ZigBee communication protocol.

10. The apparatus of claim 1, further comprising a tilt sensor to identify non-level installation and an electronic compass to determine directional orientation.

11. The apparatus of claim 10, wherein the tilt sensor and the electronic compass are configured to provide inputs to the controller and wherein the controller is configured to self-compensate for level and directional orientation in positioning the image capturing head.

12. A computer-implemented method of measuring solar radiation, comprising the steps of:
   computing a solar position angle at a given location and at a given time for a device, wherein the device comprises:
      a tracking unit having movement about an azimuth axis and an elevation axis, the tracking unit comprising an image capturing head mounted with a first sensor along the azimuth axis, a second and third sensor affixed along the elevation axis; and
      a shading disc affixed to an arm of the tracking unit and configured to extend perpendicular to the azimuth axis and mask direct solar exposure on the second optical sensor;
   aligning the device towards the sun based on the computed solar position angle; and
   measuring:
      a direct normal irradiance (DNI) from the first sensor;
      a diffuse horizontal irradiance (DHI) from the second sensor; and
      a global horizontal irradiance (GHI) from the third sensor.

13. The method of claim 12, wherein the elevation and azimuth axis are automatically calibrated before each measurement.

14. The method of claim 12, wherein the device is configured to be remotely accessed.

* * * * *